A. A. RUTTAN & C. E. HUTCHINGS.
CAMERA BACK.
APPLICATION FILED JAN. 11, 1911.
1,024,747.
Patented Apr. 30, 1912.
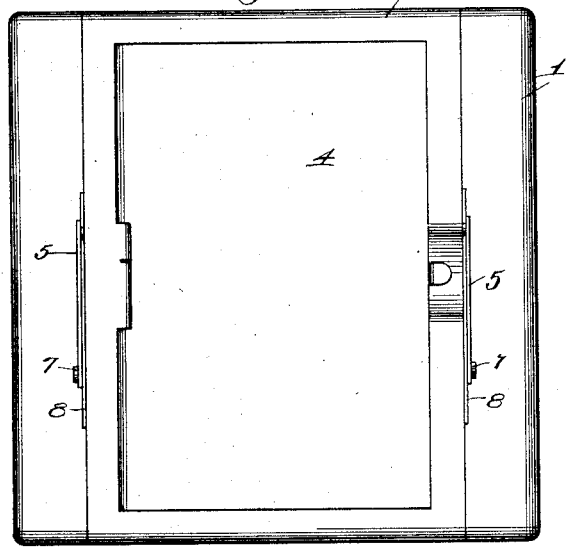
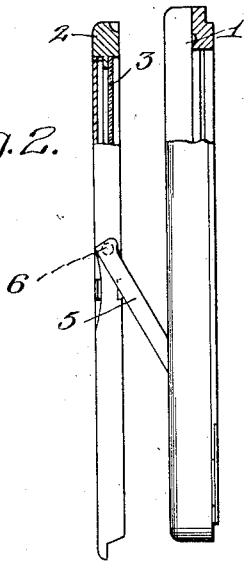
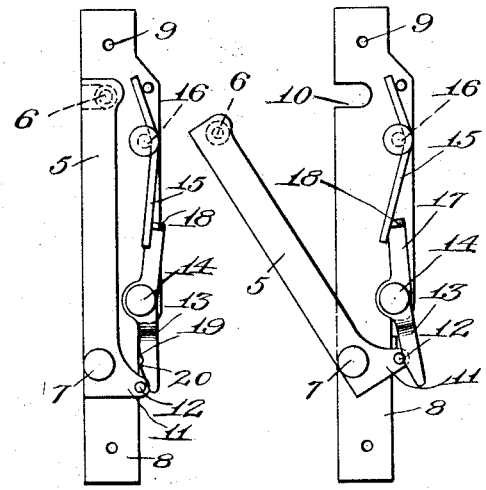
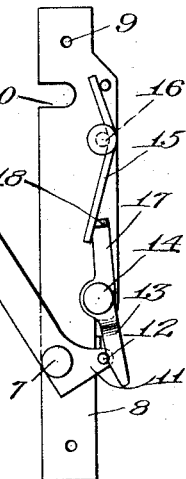
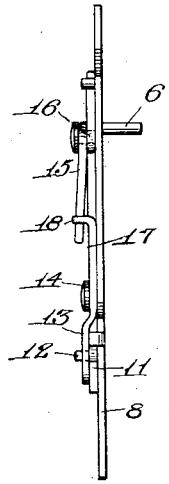
Witnesses
Nelson Copp
Russell B. Griffith
Inventors
Alfred A. Ruttan
Charles E. Hutchings
By Church & Rich
their Attorneys
COLUMBIA PLANOGRAPH CO., WASHINGTON, D. C.

UNITED STATES PATENT OFFICE.

ALFRED A. RUTTAN AND CHARLES E. HUTCHINGS, OF ROCHESTER, NEW YORK, ASSIGNORS TO EASTMAN KODAK CO., OF ROCHESTER, NEW YORK, A CORPORATION OF NEW YORK.

CAMERA-BACK.

1,024,747.  Specification of Letters Patent.  Patented Apr. 30, 1912.

Application filed January 11, 1911. Serial No. 602,049.

*To all whom it may concern:*

Be it known that we, ALFRED A. RUTTAN and CHARLES E. HUTCHINGS, both of Rochester, in the county of Monroe and State of New York, have invented certain new and useful Improvements in Camera-Backs; and we do hereby declare the following to be a full, clear, and exact description of the same, reference being had to the accompanying drawings, forming a part of this specification, and to the reference-numerals marked thereon.

Our present invention relates to photography and more particularly to photographic cameras, and it has for its object to provide a camera back having simple and improved means for connecting the separable members between which the plate holder is received and held.

A further object of the invention is to provide for gripping the plate holder between the members under spring tension and yet so arrange the parts that this pressure may be relieved during the time that the plate holder is being inserted.

To these and other ends the invention consists in certain improvements and combinations of parts all as will be hereinafter more fully described, the novel features being pointed out in the claims at the end of the specification.

In the drawings: Figure 1 is a rear elevation of a camera back constructed in accordance with and illustrating one embodiment of our invention, the plate holding members being shown in folded condition; Fig. 2 is a side elevation of the same construction with the gripping members separated for the insertion of the plate holder; Fig. 3 is a plan view of the link mechanism connecting the members in folded position; Fig. 4 is a similar view showing the positions of the parts of this mechanism when the members are separated as in Fig. 2, and Fig. 5 is an edge view of the link mechanism with the parts in the position of Fig. 4.

Similar reference numerals throughout the several figures indicate the same parts.

In the present embodiment of the invention 1 indicates the main frame or body portion of the back that receives within its central portion the extension frame 2 which usually carries the ground glass or other focusing screen 3 accessible through a door 4 therein. The two frames are connected for relative movement by a pair of links 5 each of which is pivoted to the frame 2 at the point 6 and to the other frame in the manner hereinafter set forth. This link permits the ground glass frame to rest in a folded position within the frame 1 in which the rear faces of both lie flush with each other, as shown in Fig. 1, or to be separated therefrom in parallel relationship, as shown in Fig. 2, for the insertion of the plate holder in which instance the latter occupies the seat within the frame 1 previously occupied by the frame 2 and is held therein by the latter, as will be understood by those skilled in the art and as hereinafter explained.

In the practice of our invention, as illustrated herein, we connect each link 5 to the frame 1 by pivoting it at 7 to a carrying plate 8 and the plate in turn is attached to an inner edge face of the frame as by fasteners extending through apertures 9 therein. The plate is cut away at 10 to receive the pivot 6 of the link when the members 1 and 2 are in the folded position of Figs. 1 and 3, in which case the link and plate lie side by side. An extension 11 of the link beyond the pivot 7 is provided with an abutment 12 which, as the link is carried from the position of Fig. 3 to that of Fig. 4, during the separation of the frames, traverses one arm 13 of a lever pivoted at an intermediate point 14 to the plate 8, thereby displacing or rocking the lever to a limited degree. This lever constitutes part of the tension device that includes a suitable spring 15 also secured to the plate 8 at 16, which spring coöperates with the other arm 17 of the lever, in the present instance by means of a lateral extension 18 thereon so that the abutment 12 rocks the lever against the tendency of this spring. Up to the time, therefore, that the abutment 12 in its movements reaches a dead center with respect to the adjacent pivot 7 the tendency of the tension device is to retract the link 5 and move the frames 1 and 2 together, and it is in this way that the plate holder is held clamped between the two frames. It is desirable, however, that during the time that the plate holder is being inserted the frame should be separated a distance greater than the thickness of the holder in order that the operator may slide it to its place with ease and without the pressure normally exerted by the outer frame 2. We, therefore, provide locking abutments 19 and 20 on the lever arm 13 of the tension device that may be conveniently formed by notching the said arm and these are so arranged as to coöperate with the abutment 12 on the extension of the link 5 at the time it is on the dead center with respect to the pivot 7, before referred to, and at such time the two frames are separated to a predetermined extent that is more than enough to accommodate the plate holder. The spring 15 is not sufficiently strong to disturb the engagement of these coöperating abutments in itself but after the plate holder is in place the operator has merely to exert a slight manual pressure on the frame 2 or the link 5 to cause the disengagement of the abutments and allow the two frames to move together and tightly clamp the plate holder in its proper operative position.

In the practice of our invention, therefore, the plate holder, film pack or other carrier for the sensitized medium is not subjected to the wear, nor are the frames themselves subjected to the wear, resulting in most devices of the kind heretofore produced, from the wedging of the plate holder into its place between the frames, aside from which the greater ease of manipulation is fully apparent. Furthermore, inasmuch as the whole mechanism, including the link 5, is perfectly housed and practically concealed between an outer side face of the inner frame and the inner side face of the outer frame when the two are folded, these connecting parts do not detract from the neat appearance of the back as a whole and are protected from injury both to themselves or to other bodies.

It will be noted that the metal parts can be readily assembled on the carrying plate 8 as a unitary mechanism and then the whole applied to the frames which are usually of wood and pass through a different manufacturing channel, all of which forms an item important to manufacturing cost.

We claim as our invention:

1. The combination with a camera back comprising a pair of separable frames between which the plate holder may be accommodated, of a link pivotally connected to both frames and having an extension beyond one such pivot and a tension device coöperating with the link extension.

2. The combination with a camera back comprising a pair of separable frames between which the plate holder may be accommodated, of a link pivotally connected to both frames and having an extension beyond the pivot of one of them provided with an abutment, a tension device slidably engaged by said abutment during the relative movements of the frames and a locking abutment on the tension device with which the other abutment coöperates to hold the frames in a separated condition of predetermined extent.

3. The combination with a camera back comprising a pair of separable frames between which the plate holder may be accommodated, of a link pivotally connected to each frame and a tension device coöperating with the link tending to normally move the frames together comprising an intermediately pivoted lever and a spring, one arm of the lever being engaged by the link and the other by the spring.

4. The combination with a camera back comprising a pair of separable frames between which the plate holder may be accommodated, of a link pivotally connected to each frame and having an extension beyond the pivot of one frame provided with an abutment and a tension device coöperating with the link tending to normally move the frames together, comprising an intermediately pivoted lever and a spring, one arm of the lever being engaged by the spring and the other by the link, said last mentioned arm having a locking abutment thereon with which the abutment on the link coöperates to maintain the frames in a separated condition of predetermined extent.

5. The combination with a camera back comprising a pair of separable frames between which the plate holder may be accommodated and one of which is foldable within the other, of a carrying plate secured to one frame between the inner edge face of one of them and the outer edge face of the other, a link pivoted to the plate and to the other frame and adapted to lie between the frames and adjacent to the plate when the frames are folded, an intermediately pivoted lever on the plate having one arm coöperating with the link and a spring on the plate coöperating with the other arm tending, through the medium of said link and lever, to move the frames together.

6. The combination with a camera back comprising a pair of separable frames between which the plate holder may be accommodated, of a link connecting the frames and pivoted to one of them, having an extension beyond the pivot provided with an abutment and a tension device coöperating with the abutment and tending to move the frames to folded position, said tension device being provided with a locking abutment engaged by the abutment on the link when the latter is on a dead center with the pivot to hold the frames separated to a predetermined extent.

ALFRED A. RUTTAN.
CHARLES E. HUTCHINGS.

Witnesses:
RUSSELL B. GRIFFITH,
NELSON COPP.